S. B. LADD.
Automatic Air-Brakes.
No. 165,337.  Patented July 6, 1875.
FIG. I.
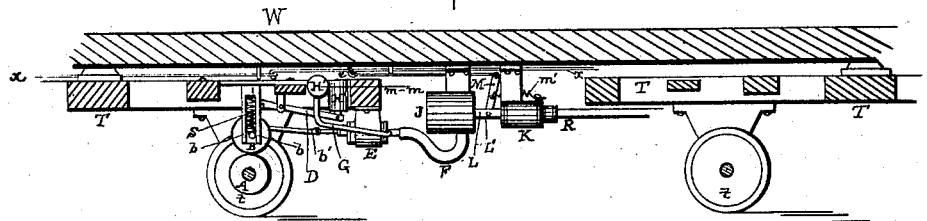
FIG. IV.
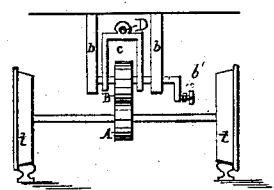
FIG. II.
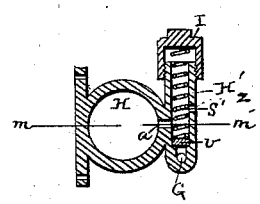
FIG. III.
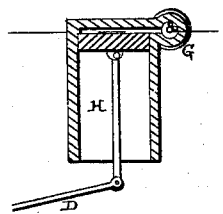
WITNESSES.
F. B. Townsend.
James Stevenson.
INVENTOR.
Storry B. Ladd
per Atty.
A. H. Evans

UNITED STATES PATENT OFFICE.

STORY B. LADD, OF WASHINGTON, DISTRICT OF COLUMBIA.

IMPROVEMENT IN AUTOMATIC AIR-BRAKES.

Specification forming part of Letters Patent No. 165,337, dated July 6, 1875; application filed February 23, 1875.

*To all whom it may concern:*

Be it known that I, STORY B. LADD, of Washington, District of Columbia, have invented certain new and useful Improvements in Car-Brakes; and I do hereby declare the following to be a full, clear, and exact description thereof, reference being had to the accompanying drawings making a part of this specification, in which—

Figure 1 is a longitudinal section of a car with my invention attached thereto. Fig. 2 is a section through line $m$ $m$ of cylinder H. Fig. 3 is a vertical section of cylinder H. Fig. 4 is a section showing crank and yoke.

The object of my invention is to provide a brake for railroad-cars operated by compressed air or steam, wherein the operation of the brakes on each particular car has an automatic action independent of the other cars or the locomotive; and it consists in certain mechanical contrivances and combinations hereinafter fully set forth and claimed.

In order that those skilled in the art may make and use my invention, I will proceed to describe the exact manner in which I have carried it out.

In the said drawings, W represents a portion of a car-body, and T T a portion of the frame of two trucks, provided with the wheels $t$ $t$. A is a friction-wheel, secured to one of the axles of the truck, and B is a similar wheel, sliding in the vertical bearings $b$ $b$, so that it will admit of being raised or lowered. In the vertical slots, between the bearings $b$ $b$ and above the lever of the friction-wheel B, I place the spring $s$, by which means the wheel B is pressed down upon the wheel A, and is caused to revolve by friction therewith. At one end of the axle of wheel B I place the crank-arm $b'$, by which means I am enabled to operate the air-pump E. Secured to the axle of the wheel B, and attached to one end of the lever D, is a yoke, $e$, by means of which the wheel B is raised or lowered, as will hereafter appear. The other end of the lever D is attached to the piston-rod of the small cylinder H, as shown in section in Fig. 3. The air-pump E is connected by a flexible pipe, F, with the reservoir J, which, in turn, is connected by the pipe L with the cylinder K, provided with the piston, and the piston-rod R, which operates the brake-levers in the ordinary way. The connecting pipe L is provided with an ordinary two-way cock, L', between the reservoir J and the brake-cylinder K, so that when the pipe leading from the reservoir is closed the brake-cylinder has a discharge-opening, and when the pipe L is open the brake-cylinder K communicates only with the reservoir, and receives from it the full power of the compressed air to force forward the piston-rod R to operate the brakes. The lever-arm M, which operates the stop-cock L', has a spring, $m'$, which keeps the cock in its normal condition, with the reservoir open and the brakes on. A cord, wire, or chain connects the end of the lever-arm M with the main cord or rod $x$ at and around the sheave $e$. The cord or rod $x$, passing beneath the cars throughout the train, operates all the brakes, and whichever way it is pulled, whether forward or rearward, the effect will be to open the cock L and release the brakes. A valve in the head of the air-pump E allows the air to pass through the pipe F into the reservoir J, while a valve in the reservoir prevents its return, so that if a car jumps the track, and the pipe F is broken, the reservoir remains charged with compressed air to operate the brakes. The pipe G connects the pipe F with the small cylinder H, through the opening $a$, communicating with the cylindrical tube H', into which the pipe G leads. Located in this tube is the valve $v$, held down upon its seat by a spring, $s'$, which bears against the screw-cap I, on the opposite end of the tube H'. By means of this cap and spring $s'$ the pressure on the valve $v$ is readily adjusted.

The operation of this portion of my invention is as follows: When the car first starts the reservoir J is supposed to be empty, and the friction-wheel B, being held by the spring $s$ against the wheel A, is caused to revolve and operate the air-pump E, thus filling the reservoir J until the pressure is up to the required point. A similar pressure being in the pipes F and G, the valve $v$ is forced back and the compressed air is admitted into the cylinder H, and forces down the piston and one end of the lever D, which necessarily raises the wheel B attached to the opposite end of the lever. When the pressure in the reservoir J falls below the required amount, the valve $v$ is again pressed back to its seat by the spring $s$, and the compressed air in the cylinder H is allowed to escape through the opening $z$ in the tube H′, while the springs $s$ force the roller B again in contact with the roller A, thus renewing the pumping process until the pressure in the reservoir J is again raised to the required amount, and thereby establishing an automatic regulation of the power necessary to operate the brakes. When the brakes are applied, the pressure in the reservoir will necessarily be diminished; but the rotation of the wheels after the brakes have been applied will be more than sufficient to restore the pressure in the reservoir, so that when the car is stopped the reservoir will be completely charged and ready for use.

Having thus described my invention, what I claim as new, and desire to secure by Letters Patent, is—

1. The wheels A and B, the latter sliding in the vertical bearings $b\ b$, in combination with the pump E, provided with the pipes F and G, and the cylinder H, all constructed to operate substantially as and for the purpose set forth.

2. The wheels A and B, constructed as described, and pump E, provided with the pipes F and G, in combination with the cylinder H and lever D, substantially as and for the purpose set forth.

STORY B. LADD.

Witnesses:
JAMES STEVENSON,
CHAS. P. WEBSTER.